United States Patent Office 2,782,769
Patented Feb. 26, 1957

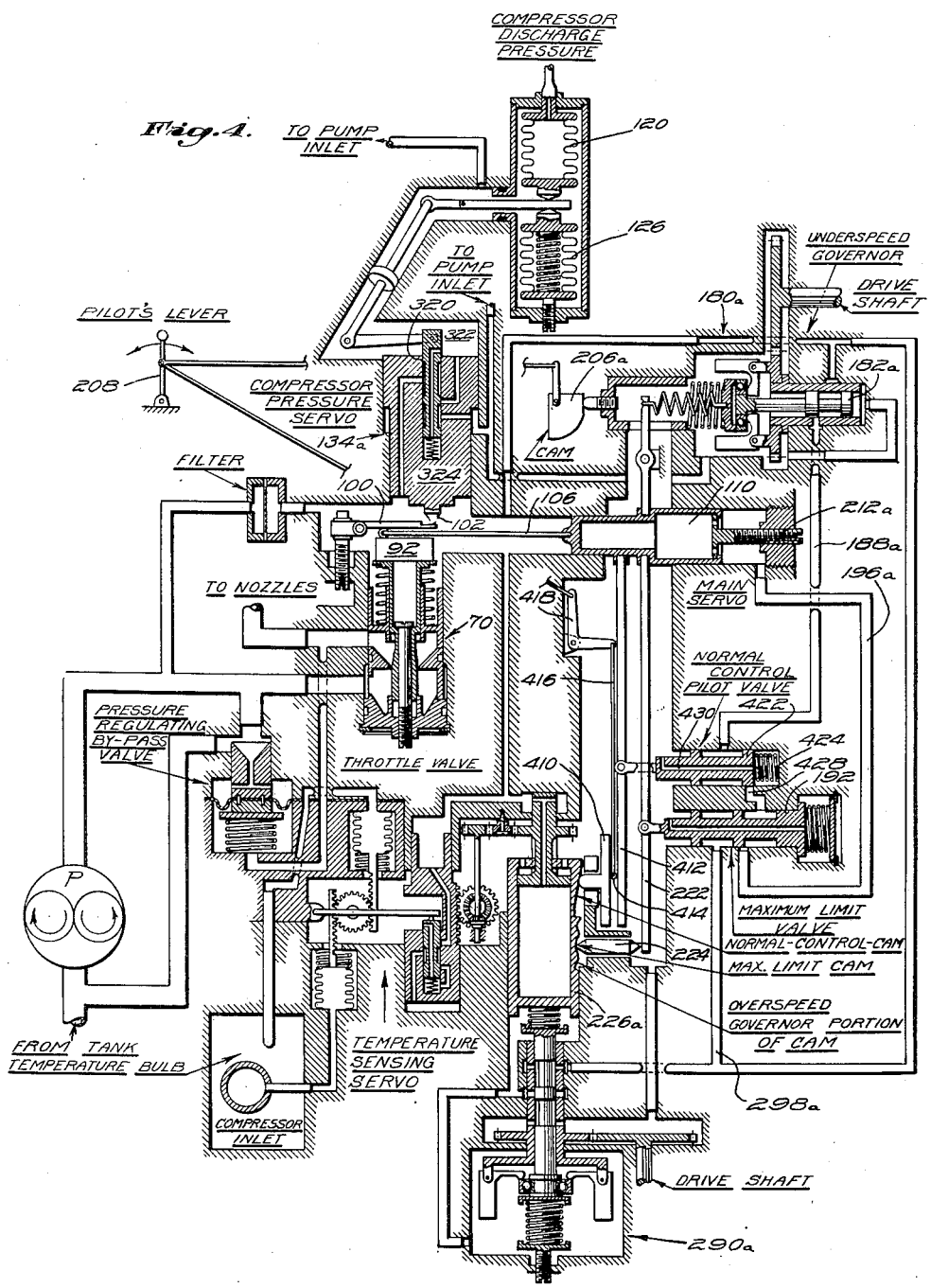

2,782,769

HYDRAULIC SERVO SYSTEM FOR FUEL CONTROL

Stanley G. Best, Manchester, Conn., assignor to United Aircraft Corporation, East Hartford, Conn., a corporation of Delaware Original application August 31, 1951, Serial No. 244,551. Divided and this application April 1, 1954, Serial No. 420,244

3 Claims. (Cl. 121—42)

This application is a division of application Serial No. 244,551, filed August 31, 1951.

This invention relates to servo systems and more particularly to hydraulic servo systems for fuel controls.

It is an object of this invention to provide a servo system for a hydraulic servomotor and includes a plurality of control valves therefor.

This and other objects of this invention will become readily apparent from the following detailed description of the drawings in which:

Fig. 4 is a diagrammatic showing illustrating the fuel control of this invention as modified for a turbo-prop power plant.

Figure 1:
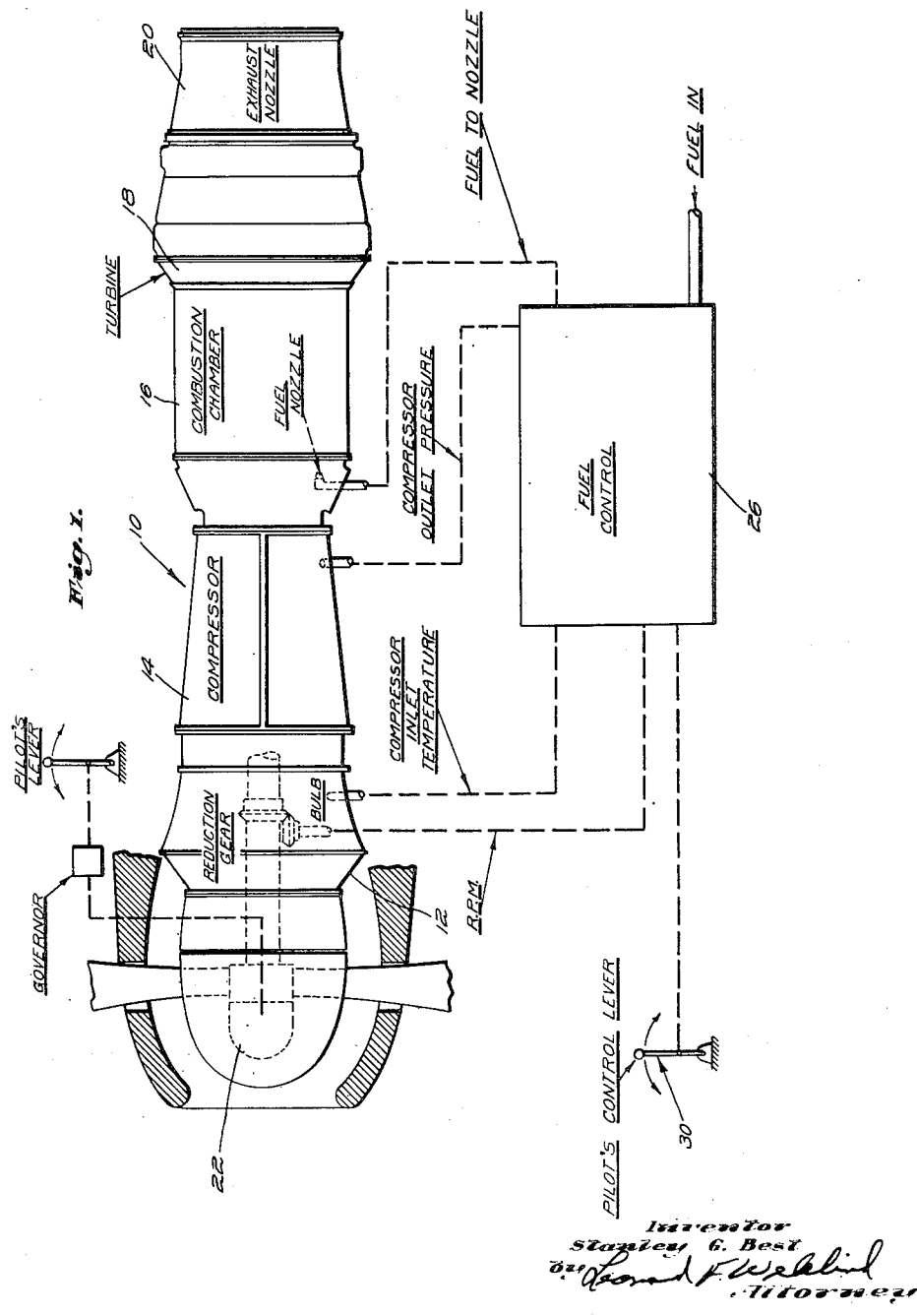
Fig. 1 is a schematic illustration of a turbo power plant with a schematically indicated fuel control operatively connected thereto.

Referring to Fig. 1, a gas turbine power plant is generally indicated at 10 and the power plant includes an air inlet 12, a compressor 14, a combustion section 16, a turbine section 18 and an exhaust nozzle 20. The turbine portion of the power plant is arranged to drive the compressor alone in the case of a turbo-jet power plant and to also drive a propeller 22 in the case of a turbo-prop power plant.

Where the power plant is of the turbo-prop type the usual variable pitch blades may be used to be controlled by a speed governor which can be set by a pilot's lever as schematically illustrated. For normal operation the propeller would have a low pitch stop as is well-known in the art.

The fuel control 26 senses the values of the same parameters of power plant operation whether utilized with a turbo-jet or a turbo-prop. As illustrated in Fig. 1, the fuel control senses R. P. M. of the power plant, compressor inlet temperature and compressor outlet pressure. A pilot's control lever 30 is operatively connected to the fuel control 26 for proper regulation thereof while fuel under pressure enters the fuel control and from there is fed to the fuel nozzles at the combustion section of the power plant.

Figure 2:
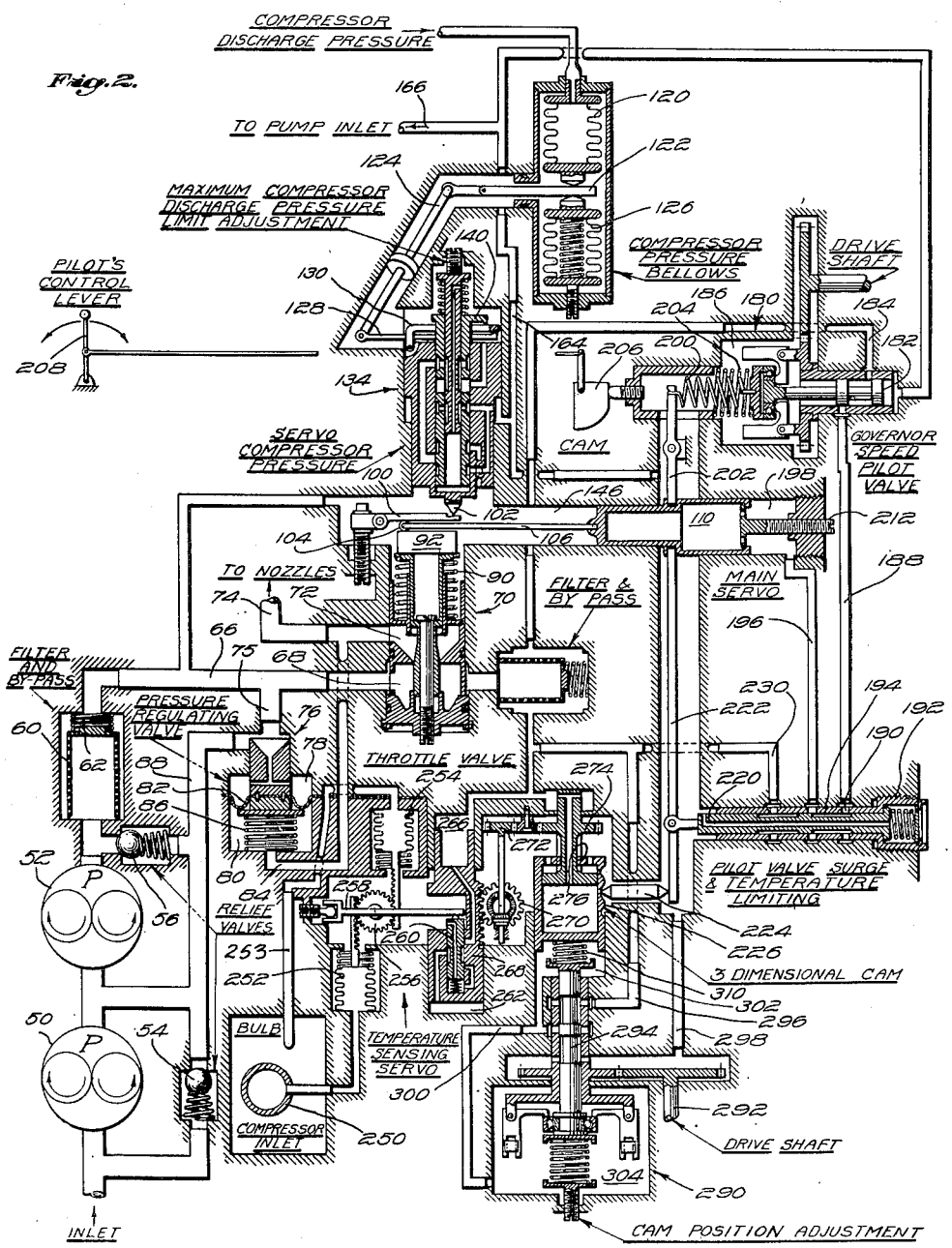
Fig. 2 is a diagrammatic illustration of the fuel control of this invention arranged for a turbo-jet power plant.

Fig. 2 diagrammatically illustrates the fuel control of this invention for a turbo-jet power plant. Fundamentally this fuel control provides two signals which correspond to compressor pressure and speed, respectively, and multiplies these signals through linkages to position a throttle valve. A constant pressure drop is maintained across the throttle valve so that each position of the valve corresponds to a definite fuel flow. Signals corresponding to engine speed and compressor inlet temperature are fed through a three dimensional cam to override the normal control and vary throttle valve opening in mixed relation with compressor pressure to limit fuel flow accordingly.

The use of compressor pressure as a controlling parameter has several distinct advantages over the use, for example, of inlet pressure to the power plant.

First there is better protection against battle damage. If a bullet hole is made in the compressor so air is bled off in large quantity, the compressor pressure falls off and cuts back fuel flow, preventing overheating of the engine. With a control based on inlet pressure, the control would not recognize the damage and would continue feeding in fuel at the same rate as before, which would overheat the engine because of the reduction in air flow through the burners. Second, along the same line, the temperature limiting is still very nearly correct when air is bled off the compressor for operating accessories, whereas it would not be in the case of a control based on inlet pressure. Third, greater consistency can be expected, since absolute pressure at the turbine nozzles, which is substantially equal to compressor discharge pressure, is, at a given limiting turbine inlet temperature and normal choked nozzle conditions, the single factor which directly determines mass air flow through the engine. Inlet pressure determines mass flow in a much more indirect manner. Fourth, the effects of variations in speed and temperature are reduced radically so that accurate measurements of these quantities are not required and design of the three dimensional cam is greatly simplified.

Referring to Fig. 2, a low pressure pump 50 and a high pressure pump 52 may be provided as well as a relief valve 54 for the low pressure stage and a relief valve 56 for the high pressure stage. A filter 60 is provided prior to the entry of the fuel into the system and this filter may include a spring 62 to permit by-pass of the fuel when a predetermined pressure across the filter obtains. In the event of filter clogging the pressure will raise the filter 60 against spring 62 so that fuel will flow around the filter. High pressure fuel enters the line 66 to the inlet chamber 68 of a throttle valve generally indicated at 70. As the throttle valve is opened fuel passes through the chamber 68 to the chamber 72 and then to the line 74 leading to the nozzles of the power plant. A T 75 in the line 66 leads to a pressure regulator valve 76 which includes a chamber 78 and a chamber 80 separated by a diaphragm 82. The chamber 80 of the pressure regulator valve 76 communicates via a line 84 with the outlet side of the throttle valve, i. e., the chamber 72. The chamber 78 is under pressure equivalent to the inlet pressure to the throttle valve. The spring 86 biases the valve toward a closed position and the relative strength of this spring and the force responsive areas at opposite ends of the pressure regulator valve 76 determine the fixed pressure drop which will be maintained across the throttle valve. Any fuel that is by-passed by the pressure regulator valve is carried back to the inlet of the pump 52 via the line 88. It will of course be understood that the throttle valve 70 will have fixed maximum and minimum opening stops incorporated therein.

The throttle valve 70 is biased toward a closed position by a spring 90 which bears against an enlarged upper portion 92 of the movable element of the valve. Motion is imparted to the movable valve element by means of a pivoted arm 100 which has its free end engaging a movable knife edge 102. Interposed between the arm 100 and the valve head 92 is a roller 104 which is carried by a reciprocating rod 106 which in turn is moved by a piston 110 of the main servomotor. The mechanism consisting of the arm 100, the roller 104 and the knife edge 102 is arranged to multiply the motion of the knife edge 102 and the roller 104 as reciprocated by the rod 106.

The knife edge 102 moves in a predetermined direction linearly with compressor pressure but after a predetermined pressure has been reached the knife edge 102 moves in the opposite direction linearly with continued increase in compressor pressure to provide a maximum pressure limiter by reducing fuel flow after the preselected pressure has been reached. The mechanism providing this type of movement will be described immediately hereinafter.

Figure 3:
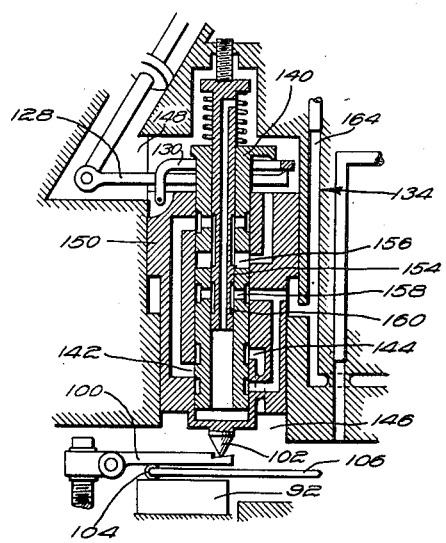
Fig. 3 is a detailed illustration of the compressor pressure servo mechanism.

Compressor discharge pressure is admitted internally of a bellows 120 which has its free end engaging an arm 122 which is fixed to and pivots about the axis of a rod 124. A second bellows 126 is evacuated and acts in opposition to the bellows 120 thereby providing motion to the arm 122 as a function of absolute pressure in the compressor. Motion of the arm 122 is transmitted via the rod 124 to another arm 128 which engages a pivoted member 130. The arm 130 in turn transmits motion to the compressor pressure servo system generally indicated in Fig. 2 as 134 and illustrated in better detail in Fig. 3.

As was previously mentioned, the compressor pressure servo mechanism 134 and its knife edge 102 operates so as to increase or decrease throttle valve setting by increasing or decreasing its effect on the multiplying linkage. Referring to both Figs. 2 and 3, the operation of the compressor pressure servo system is best described in the following manner. As compressor pressure increases the arm 122 and likewise the arm 128 will be urged in a downward direction. This causes downward movement of a movable valve element 140 so that the port 142 will communicate with the port 144 so that high pressure fuel from the chamber 146 will flow to the chamber 148 adjacent the top of the movable valve element 140. High pressure in the chamber 148 causes the servo main body 150 to move downward to again close off communication between the ports 142 and 144. In the event that this downward motion of the valve element 140 and the main body 150 and, of course, the knife edge 102 is continued or repeated, a land 154 carried by a central fixed valve element will cover the port 156 so that any further movement of the movable valve element 140 in a downward direction will cause port 156 to be placed in communication with port 158 via the annulus 160 so that fuel in chamber 148 will be connected to the line 164 leading to the drain line 166. When the chamber 148 is subjected to drain pressure the higher pressure in chamber 146 will tend to move the main body portion 150 and its accompanying knife edge 102 in an upward direction in direct response to continued increase in compressor pressure. This in turn causes a decrease in fuel flow by closing the throttle valve.

Normal control of the roller 104, the rod 106 and the servo piston 110 is determined by a speed signal which is obtained from a flyball speed governor 180. The governor is driven by a drive shaft and, depending upon the off-speed condition, the governor positions a pilot valve 182. High pressure fuel is admitted to the valve 182 via a line 184 while low pressure fuel or drain pressure exists in the chamber 186 within the body of the governor 180. It is then apparent that movement of the valve 182 to the left will cause high pressure fluid to flow in the line 188 through the port 190 of a second pilot valve 192 thence to the annulus 194 and line 196 and then to chamber 198 to move the piston 110 toward the left. Under these conditions, although both ends of the piston 110 are subjected to high pressure, the area of the right-hand side of the piston 110 is larger than the left-hand side; therefore, motion to the left results. Motion of the piston 110 to the left causes a decrease in fuel flow through the throttle valve. The decrease in fuel results from the fact that the lever 100 is just below a horizontal position for zero compressor pressure and sloping down toward the right at other values of compressor pressure. Under such conditions movement of rod 106 to the left will cause the throttle valve to move toward a closed position. In the event that an underspeed condition exists, the flyweights of the governor 180 will move the pilot valve 182 to the right thereby directing drain pressure through the line 188 and eventually to the line 196 in the chamber 198 so that the high pressure on the left-hand side of the main servo piston 110 will move the piston to the right to increase its effect on the multiplying linkage and thus to move the valve for increased fuel flow. It will be noted that the speed governor 180 includes a spring 200 which has an operative connection via the lever 202 to the main servo piston 110. Thus, each movement of the servo piston 110 causes a resetting of the governor 180 thereby providing a permanent droop in the response of this governor. A second spring 204 is adjusted via a cam schematically illustrated at 206 which is moved in response to movements of the pilot's lever 208. Hence, different power settings will correspond to different speed settings of the speed governor 180. With a droop governor of the type shown a signal is obtained which levels out at a predetermined high speed to establish in the throttle valve a minimum fuel flow which is proportional to compressor pressure.

It will be noted that the pilot valve 182 controlled by the speed governor 180 is capable of controlling the main servo piston 110 only when the valve 192 is positioned as shown in Fig. 2. The pilot valve 192 acts as an overriding mechanism which responds to a function excessive temperature at the compressor inlet and the speed of the power plant. The valve 192 then is a maximum limiting valve. Motion is imparted to the movable member 220 of the valve 192 by means of a lever 222 and a knife edge 224. Motion is imparted to the knife edge 224 by a three dimensional cam 226 which rotates in response to compressor inlet temperature and reciprocates in response to power plant speed. The operational movements of the cam in response to these parameters will be described hereinafter. However, when the desired limits are reached the knife edge 224 is moved to the right as is the central valve element 220 of the valve 192. This motion of the valve element 220 places the line 196 in communication with the high pressure fuel line 230 so that high pressure fuel exists in the chamber 198 on the right-hand side of the servo system 110 to cause a corresponding decrease in fuel flow.

It should be added that the minimum opening of the throttle valve 70 is set by an adjusting screw 212 which engages the right-hand end of the main servo piston 110 to limit the piston's leftward movement.

In order to obtain rotation of the three dimensional cam 226 in response to compressor inlet temperature, a bulb 250 is provided which communicates with bellows 252. Variations in pressure within these bellows causes motion through a rack and pinion 256 which in turn moves a pivoted arm 258. The bellows 254 acts as a compensating bellows while the bellows 252 is the temperature responsive bellows. The compensating bellows 254 is connected to line 253 which is closed at its terminus adjacent the temperature sensing bulb. Hence any variations in temperature which may occur along the lines between the sensing bulb and the bellows will be compensated for at the bellows. In other words, any variations occurring between the sensing bulb and bellows 252 will be counteracted by similar but opposing action by bellows 254 on pinion 256. Motion of the arm 258 moves the valve element 260 so that downward motion of the valve will connect the chamber 262 with drain pressure then existing in the chamber 264. Upward motion of the valve 260 connects the chamber 262 with the high pressure chamber 266. With high pressure in the chamber 262 the main servo body 268 will be moved upwardly so as to impart motion to the rack and pinion 270 and also the gears 272, 274. The gear 274 is splined at 276 with the main cam body so as to rotate the cam in a given direction. When drain pressure exists in the chamber 262 the high pressure in the chamber 266 forces the servo main body 268 in a downward direction to rotate the three dimensional cam 226 in the opposite direction.

The three dimensional cam 226 is reciprocated by means of a speed responsive servo system which provides a permanent droop in the governing action of the system. A speed governor 290 is driven by a drive shaft 292 and acts to reciprocate a pilot valve 294. The pilot valve 294 permits communication of high pressure from the line 296 or drain pressure from the line 298 into the line 300 which leads to the upper chamber 302 and the lower chamber 304 at opposite ends of the pilot valve. This insures equal force on either end of the pilot valve. However, at the same time the cam 226 is forced in either of two directions depending on whether drain pressure or high pressure is being admitted to the chamber 302 adjacent the lower end of the cam body. It will be noted that with each axial movement of the cam 226 the tension on spring 310 will be varied so that in reality the speed governor 290 will be reset. This provides a servo mechanism in which the cam 226 will have a definite position for each speed setting of the governor.

The surface contour of the cam 226 is determined by superimposing a family of curves corresponding to the compressor surge line and maximum desirable temperature. The curves in the final analysis are plotted as a comparison of the ratio of fuel flow and compressor pressure against engine speed. The family of curves is obtained by plotting them for various values of inlet temperature. The surge line and maximum desired temperature together then define the cam contour. The theoretical derivation of these curves is omitted herein for convenience. It should be added that compressor surge is that point at which under particular conditions the compressor operates erratically.

From the foregoing description it is evident that the major controlling parameters are that of engine speed and compressor pressure. Signals equivalent to these parameters are multiplied for controlling a single throttle valve. The speed controlling signal is subject to being overriden by a maximum limiting signal corresponding to speed and compressor inlet temperature. The compressor pressure signal is subject to being modified or limited in its controlling effect by the reversing mechanism in the compressor pressure servo system 134.

Figure 5:
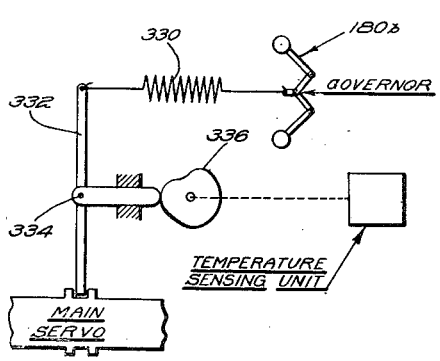
Fig. 5 is a schematic showing of a temperature compensating mechanism for the fuel control.

The governor 180 of Fig. 2 and its related system may include a temperature compensating device which is schematically illustrated in Fig. 5. Thus a speed governor 180b is shown including a reset spring 330 which is varied in tension upon movement of a lever 332 about its pivot 334. The main servo which feeds motion to the multiplying mechanism at the throttle valve tends to reset the governor for each position thereof. For variations in ambient air temperature certain compensation may be desired either to maintain the power plant speed constant at given power settings or to vary speed according to a desired schedule while operating through varied ambient air temperatures. To this end a cam 336 may be utilized to vary the position of the pivot 334 in response to variations in ambient air temperature. The particular type of desired response will be determined by the profile of cam 336.

Figure 6:
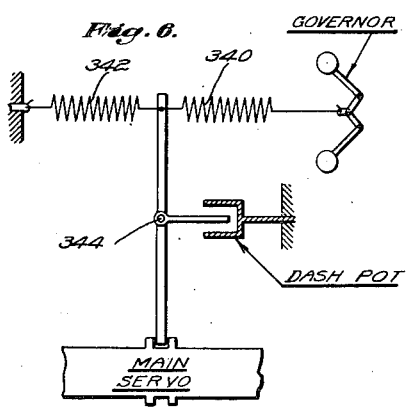
Fig. 6 is a schematic showing of an additional feature for producing isochronous speed governing.

In addition, it may be desirable to avoid a permanent droop effect in the governor 180 of Fig. 2 and its related system. To obtain this effect a dashpot may be provided to produce a temporary feedback to the reset spring upon movement of the main servo. This additional feature is best shown in Fig. 6. Here the governor has a setting spring and a preload spring 342. The pivot point 344 has a dashpot connected thereto, as illustrated. Thus, movements of the main servo will have only a temporary effect on the setting of the governor and provides isochronous governing action.

Referring to Fig. 4, a turbo-prop version of the fuel control of this invention is illustrated. The Fig. 4 fuel system is substantially identical to that illustrated in Fig. 2 with a few structural elements added thereto. Hence, in describing Fig. 4, repetition of the operation of several major components will be omitted for convenience.

Thus the throttle valve 70 is identical to the Fig. 2 construction and is operated in substantially the same manner. The compressor pressure servo system 134a moves its knife edge 102 to increase fuel flow proportional to compressor pressure. Though not shown herein, a system identical to 134 of Fig. 2 may be used so that the servo system operates to move the knife edge to increase fuel in response to pressure increase up to a predetermined pressure and then to decrease fuel flow with further increase in compressor pressure. The servo system 134a operates to move knife edge 102 in response to movements of valve 320 which directs either high or low pressure fuel to the chamber 322 above the main servo body 324. Motion of the knife edge 102 is multiplied by the motion of the main servo piston 110. In the case of this construction, however, the speed governor 180a is utilized as an underspeed governor rather than as a primary controlling unit.

The normal or primary control utilizes a function of compressor inlet temperature and power plant speed with the resultant motion produced by the temperature sensing servo and the speed governor 290a on the three dimensional cam 226a. Thus the cam 226a includes a normal control cam surface, a maximum limit cam surface and an overspeed cam surface as labelled in Fig. 4. With the temperature sensing servo and the speed governor 290a, including its servo system, operating in the manner described in connection with Fig. 2 the normal control cam portion of the cam 226a operates a member 410 which imparts motion to a lever 412 via a roller 414. The roller 414 varies the fulcrum between the member 410 and the lever 412 by being reciprocated by a rod 416. Rod 416 is in turn operated through a bell crank 418 which has an operative connection to the pilot's lever 208. The output of the lever 412 is in reality equal to the product of the motion resulting from the speed and temperature function and the motion of the roller 414 as caused by movement of the pilot's lever 208. As differing now from the control illustrated in Fig. 2, the output of the lever 412 is imparted to the movable portion 422 of a normal control pilot valve 424 which is interposed in series between the pilot valve 182a of the speed governor 180a and the maximum limit pilot valve 192.

Since the speed governor 180a functions as an underspeed governor it will have a setting somewhat lower than the propeller governor illustrated in Fig. 1. Then, as far as the governor 180a is concerned, the power plant in the normal range of operation is continuously overspeeding to the extent that high pressure fluid will be directed into the line 188a which leads to the normal control pilot valve 424. The normal control pilot valve 424 can permit this high pressure flow to enter the line 428 leading to the maximum limit pilot valve 192 or else it can admit drain or low pressure fluid via the line 430 to the line 428 leading to the maximum limit valve 192. In the normal control range then the pilot valve 182a of the speed governor 180a and the maximum limit pilot valve 192 are not effective to control the flow of fluid leading to the main servo via the line 196a.

As previously described, the maximum limit pilot valve 192 in response to excessive temperature or speed can permit high pressure fluid to flow from the line 298a into the line 196a to move the main servo piston 110 to the left to decrease fuel flow.

As stated above, the propeller governor will have a higher speed setting than the underspeed governor 180a to the extent that the propeller governor will, for example, be set to move the propeller blades against their low pitch stop, for instance below 1000 R. P. M. The underspeed governor 180a on the other hand as a result of the tension of its springs and the contour of the cam 206a, will be set to take effect for example at 950 R. P. M. Thus at power plant speeds below 1000 R. P. M., as for example when the power plant is throttled back in landing approach of the aircraft, the normal control pilot valve will be positioned so as to permit communication of fluid from the pilot valve 182a via the line 188a down through the maximum limit pilot valve 192 and eventually to the main servo and its piston 110. The normal control pilot valve 424 is positioned in this manner in low power settings of the pilot's lever 208 since the bell crank 418, rod 416 and roller 414 will be positioned to move the lever 412 and the movable element 422 of the pilot valve 424 to the right to open the line 428 to line 188a leading from the pilot valve 182a.

In a turbo-prop installation and particularly in multi-engine operation, having an underspeed governor is of primary importance. At low power settings and low or zero thrust, a turbo power plant is developing and consuming power in the turbine (to drive the compressor) at a relatively high rate. Therefore, small variations in fuel flow in this range can result in rapid and large changes in positive or negative thrust output. In a multi-engine installation considerable yaw in the aircraft would normally be experienced. The underspeed governor then accurately controls power plant speed and thrust by regulating fuel flow in this power range setting to overcome sudden variations in thrust.

Another reason it is desired to have the underspeed governor control power plant speed in the low prop. R. P. M. range is that in the event a go-around is necessary, immediate response of the power plant is desired. Since the inertia of a gas turbine power plant is relatively high, it is desirable to maintain its speed relatively high in the low power settings. Thus the underspeed governor maintains a relatively high power plant speed by directly controlling fuel flow in multiplied relation with compressor pressure where the propeller blades of a turbo-prop installation are against their low pitch stop and the pilot's lever is at a low power setting other than in the idle or off position, for example, in a flight idle position. The underspeed governor also controls the ground idle of the power plant.

It is, of course, apparent that the idle or minimum flow setting for the throttle valve 70 is preset by the adjusting mechanism 212a as in the case of the fuel system illustrated in Fig. 2.

It will be evident that as a result of this invention an accurate, highly responsive but rugged fuel control has been provided which is adaptable to various types of gas turbine power plants.

Although certain embodiments of this invention have been illustrated and described herein, it is to be understood that various changes and modifications may be made in the construction and arrangement of the various parts without departing from the scope of this novel concept.

What it is desired to obtain by Letters Patent is:

1. In a servo system including a fluid cylinder, the combination of a source of fluid under pressure and means for controlling the flow of fluid to said cylinder comprising a plurality of pilot valves in series relation between said source and cylinder, means for overriding the effect of one of said valves on said cylinder upon movement of another of said valves in a given direction, at least one additional pilot valve in series with said plurality of valves, and means for overriding the effect of said plurality of valves on said cylinder upon movement of said additional valve in a given direction.

2. In a servo system having a fluid motor movable in two directions, a source of fluid under pressure, a drain, a first pilot valve operatively connected to said motor and said source and drain for selectively connecting said motor to said source or drain, a second pilot valve connected in series with said first valve for selectively connecting said motor to said first valve or drain, and a third pilot valve operatively connected in series with said first and second pilot valves for selectively connecting said motor to said first and second pilot valves or to said source of pressure.

3. In a servo system having a fluid motor movable in two directions, said motor having two operative sides of unequal area, a source of fluid under pressure, means continuously connecting the motor side of smaller area to said source, a drain, a first valve for selectively connecting the motor side of larger area to either said source or drain, a second valve for selectively connecting said motor side of larger area with said first valve or drain, and a third valve for selectively connecting said motor side of larger area to said second valve or to said source of pressure.

References Cited in the file of this patent
UNITED STATES PATENTS
2,667,743     Lee _____ Feb. 2, 1954
FOREIGN PATENTS
238,393     Switzerland _____ Nov. 1, 1945